United States Patent [19]
Zepke et al.

[11] Patent Number: 5,711,480
[45] Date of Patent: Jan. 27, 1998

[54] LOW-COST WIRELESS HVAC SYSTEMS

[75] Inventors: Bruce E. Zepke, Glastonbury; Merrill R. Lucia, Chaplin; Charles R. Winston, Jr., Glastonbury; Earl D. Hasselmark, Barkhamsted; Taeyoung Park, Shelton, all of Conn.

[73] Assignee: Carrier Corporation, Farmington, Conn.

[21] Appl. No.: 731,633

[22] Filed: Oct. 15, 1996

[51] Int. Cl.$^6$ ............................ G05D 23/00; H04Q 7/00
[52] U.S. Cl. .................... 236/51; 318/16; 340/325.72
[58] Field of Search ..................... 340/325.72; 318/16; 236/51

[56] References Cited

U.S. PATENT DOCUMENTS

| | | | |
|---|---|---|---|
| 3,159,212 | 12/1964 | Patrick | 165/267 |
| 3,605,877 | 9/1971 | Isaccs et al. | 165/267 |

Primary Examiner—William E. Wayner

[57] ABSTRACT

Communication between the various elements of HVAC systems is effected by means of low-cost, low-power, narrow-band AM SAW-stabilized transmitters 21, 27, 39, 86 and receivers 18, 28, 47, 89. A residential embodiment (FIG. 1) transmits temperature information from each room of the house to a master control 24, which is used to control the HVAC demand and to control the damper in the corresponding room. In a first commercial building embodiment (FIGS. 2 and 3), thermostat/transceiver 61–66 assemblies transmit not only demand and control information from the corresponding thermostat 78 (with switches), but relay information transmitted from other thermostat/transceiver assemblies, whereby messages are retransmitted from one floor to the next to overcome the high attenuation of commercial building construction in reaching rooftop HVAC systems 71–76. In a second commercial building embodiment (FIG. 4), messages are transmitted from a thermostat/transceiver assembly 92 in each floor to a relaying transceiver assembly 96 in a stairwell, the transmissions to rooftop units 93, 97 being made with little attenuation through the stairwell and the roof. Message protocols with or without acknowledgement may be used. Relative humidity and $CO_2$ level may be controlled as well as temperature.

31 Claims, 3 Drawing Sheets

LOW-COST WIRELESS HVAC SYSTEMS

TECHNICAL FIELD

This invention relates to low-cost wireless communication linking elements of heating, ventilating and air conditioning systems (HVAC), in both residential and commercial building embodiments, utilizing low-cost, surface acoustic wave (SAW) stabilized, amplitude modulated (AM) radio receivers and transmitters.

BACKGROUND ART

Most present HVAC systems have the elements thereof linked together directly by wire to transmit analog signals indicative of sensed characteristics such as temperature relative humidity, or $CO_2$ level, discrete signals indicative of demand for heating or cooling, relative humidity, or $CO_2$ level, and fan operation, and/or digital signals indicative of actual and desired conditions within the system.

A wireless HVAC system is disclosed in U.S. Pat. No. 5,224,648. The system therein utilizes spread spectrum frequency modulated (FM) transmission which can be utilized with output power of on the order of one watt in the 900 megahertz regime without the need of an FCC site license. While spread spectrum FM provides a high degree of noise immunity, there also are a large number of competing transmitters, including wireless telephones, wireless local area networks, and other devices. Therefore, interference-free operation may require additional system sophistication, and therefore greater cost. While the power of spread spectrum systems allows communication on the order of a city block or more, and permits transmission through the elements of commercial buildings (such as steel reinforced concrete flooring), the power consumption is such as to require each element to be dynamically powered through an AC outlet or by batteries. If batteries are used in such a system, batteries need be large, bulky, expensive, or suffer from battery life which is too short to be practical (weeks or months).

DISCLOSURE OF INVENTION

Objects of the invention include provision of a wireless HVAC system which is low in cost and can be operated for long periods of time on small, common batteries.

This invention is predicated in part on the concept that narrow band amplitude modulated AM transmission can provide adequate noise immunity when operating in a regulated low-power spectrum without a site license, in part on the concept that an HVAC system can be implemented utilizing RF transmission with merely enough power to penetrate through a single level of a multi-level building by retransmitting the signal from each level to the next, and in part on the concept that the capabilities of a sophisticated system are not really necessary for communications in HVAC systems, which systems are, after all, extremely simple to control. This invention is also predicated on the concept that HVAC systems are generally non-critical, and with very slow response times (on the order of minutes), and therefore can operate with relatively few, randomly-transmitted messages.

According to the present invention, a wireless HVAC system employs low cost, low power, surface acoustic wave SAW-stabilized, narrow band AM radio transmitters and receivers as communication links between the operative elements thereof. In accordance with the invention, low power, low cost, SAW-stabilized, narrow band AM radio transceivers are utilized as relays to transmit signals from one level of a building to the next level of the building so that the low powered signals will ultimately reach through several levels of a building, even when the levels are separated by steel and concrete. The invention may be used to control temperature, $CO_2$ level and/or humidity.

In one embodiment of the invention, temperature within each room of a multi-room residential HVAC system, wherein each room comprises a zone, is transmitted by a corresponding low power, low cost, SAW-stabilized, narrow band, AM radio transmitter to a receiver on a master controller, and a similar transmitter on the master controller will transmit a corresponding desired response to a similar receiver on a damper regulating HVAC system airflow into the corresponding room. In another form of the invention, the temperature signal is relayed by low power, low cost, SAW-stabilized, narrow band, AM radio transceivers, the receiving portion of which is utilized to provide an acknowledgement signal, thereby providing integrity of transmission even though only providing one signal transmission for each change in condition.

In further accord with the invention, transceivers are utilized as relays such that every transmitted signal gets retransmitted by one or more transceivers at each level of a building, thereby ensuring that the transmission will be received even though there is prohibitive attenuation between the point of original transmission and the point of ultimate reception.

In accordance with another aspect of the present invention, low powered SAW transmitters may be utilized to transmit HVAC control messages within the low RF attenuating stairwells of buildings which have high RF attenuation between one floor and the next.

The invention may be implemented with readily available low power, low cost, SAW-stabilized, narrow band, AM radio receivers and transmitters which are utilizable without site license under FCC Part 15 regulations. The invention utilizes transmitters and receivers as well as very simple microprocessors, the power consumption of which is sufficiently small that ordinary common batteries may be utilized with a suitably long useful life (on the order of a year). The invention is practiced utilizing only apparatus and techniques which are well within the skill of the art, in the light of the teachings which follow hereinafter.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
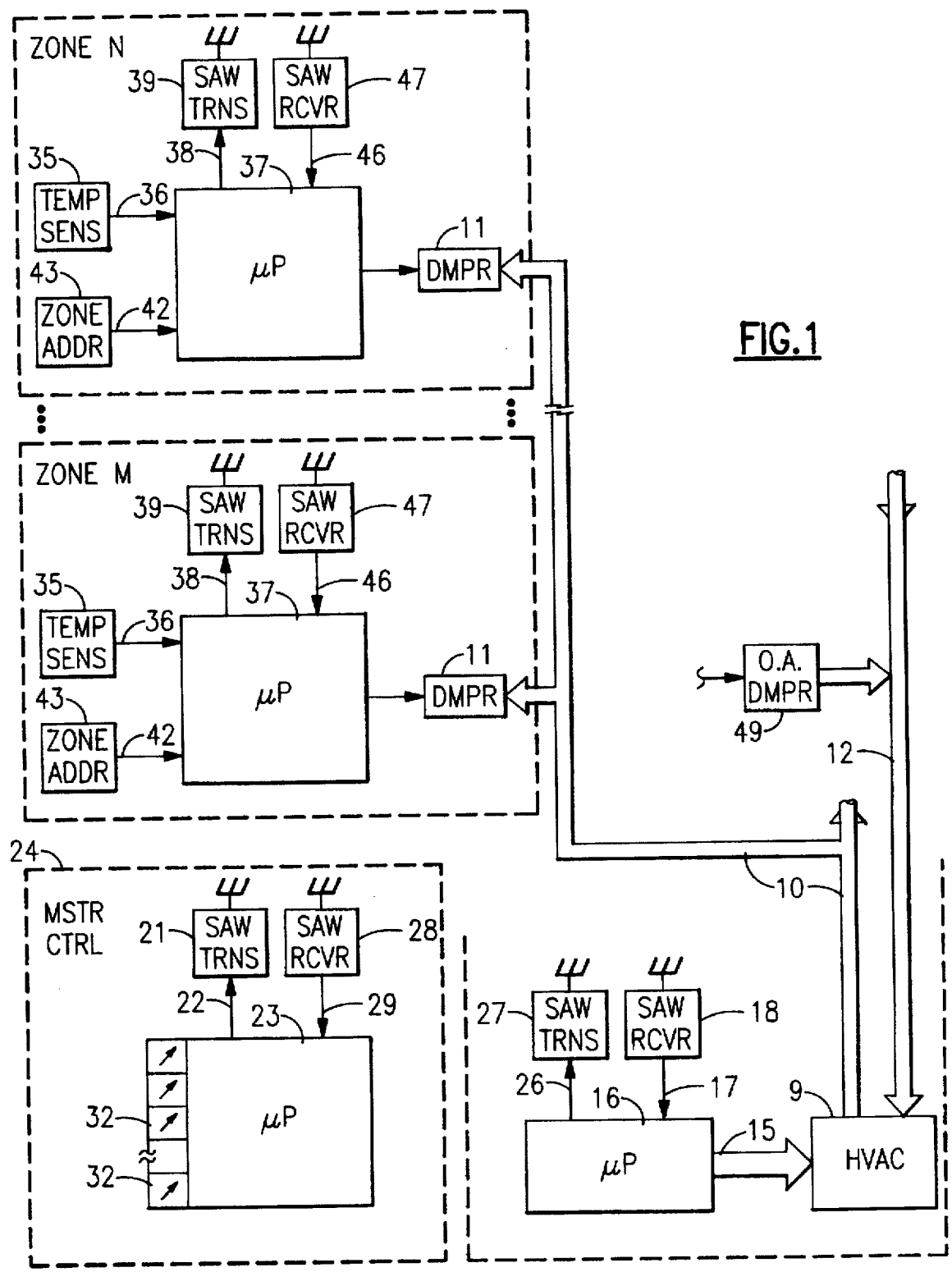
FIG. 1 is a simplified, stylized schematic block diagram of a residential HVAC installation utilizing the present invention.

In FIG. 1, an HVAC unit 9 supplies conditioned (heated or cooled) air through a duct 10 to a plurality of dampers 11, there being one damper in each room of the corresponding building, which may typically be a residence. Air is returned from the rooms through return inlets (not shown) and a return duct 12. Each room of the building is considered a zone M . . . N for HVAC purposes.

The functions of the HVAC 9 (heating, cooling and air motion) are effected in response to signals on a trunk of lines 15 from a microprocessor 16, which in turn receives commands over a line 17 from a SAW receiver 18. The microprocessor 16 responds to signals from the receiver 18 which are sent thereto by a SAW transmitter 21 in response to signals on a line 22 from a microprocessor 23 in a master control 24. In response to recognition of command signals sent thereto, the microprocessor 16 may provide signals on a line 26 to cause a SAW transmitter 27 to transmit an acknowledgement to a SAW receiver 28 connected to the microprocessor 23 by signal lines 29. The microprocessor 23 has a plurality of temperature set point inputs 32, one corresponding to each of the zones M . . . N, to define the desired temperature for the corresponding zone.

Each zone has a temperature sensor 35 which provides an input over a signal line 36 to a corresponding microprocessor 37. In the present embodiment, whenever one of the microprocessors 37 determines that the temperature has changed by some threshold amount from a previous temperature which has been communicated to the master control 24, the new temperature will be formulated in a message sent over signal lines 38 for transmission by a SAW transmitter 39 to the SAW receiver 28 in the master control 24. In order to identify the zone related to the temperature indicated in the message, the transmitted message includes a zone address provided by the microprocessor 37 in response to suitable signals on lines 42 from a zone address switch 43 connected to each microprocessor 37. In order to receive acknowledgement signals, if desired, the microprocessors 37 also have signal lines 46 connecting them with corresponding SAW receivers 47. However, if no acknowledgement signal is necessary in the implementation of the present invention, the SAW receivers 47 and/or the SAW transmitter 27 need not be utilized. The sensors 35 could include, or instead be, $CO_2$ or humidity sensors.

Operation of this embodiment may take a variety of forms. Typically, the master control will compare received temperature messages with corresponding setpoints for the various zones, and when a temperature message indicates that a zone has veered from a desired temperature by a threshold amount, the microprocessor 23 will send a message to the microprocessor 16 to cause the proper conditioning of the air (heating or cooling) so that such air passing through the damper 11 of the corresponding zone will tend to correct the temperature. In the embodiment shown in FIG. 1, it is assumed that each microprocessor 37 is directly wired to the corresponding damper 11. However, whenever this is not possible, each damper may have associated therewith its own microprocessor and SAW receiver (along with a SAW transmitter for acknowledgment messages, if desired). Within each zone, the microprocessor will operate the damper to permit maximum, minimum, or some in-between amount of air as determined by the difference in the temperature sensed in the zone and the temperature of the air in the duct 10. In the embodiment of FIG. 1, this is achieved by the microprocessor 23 sending a message to the related microprocessor 37 to regulate the damper accordingly. In other embodiments of the invention, the microprocessor may also respond to a temperature sensor in the duct 10 immediately adjacent the damper 11, whereby it can determine the correct setting for the damper by comparing the setpoint temperature with actual temperature, and with the duct temperature, in a well-known fashion. Or, each damper may be controlled directly by the temperature sensor 37, or a thermostat, directly associated therewith, through RF transmissions. As is known, in the event that one zone requires heat while the other zone requires cooling, the microprocessor 23 will respond to the comparison of setpoint inputs 32 with the temperature messages received to cause the HVAC 9 to cycle between heating and cooling in response to messages sent through the microprocessor 16. The sensors could also, or instead, comprise $CO_2$ level sensors and/or relative humidity sensors. Most HVACs include humidifiers; the return duct 12 may have a fresh air inlet damper 49, controlled by a microprocessor (such as 37) communicating with a transmitter (such as 39) and/or a receiver (such as 47), in response to $CO_2$ level. All of this is well known in the art and forms no part of the present invention.

In the present embodiment, it is assumed that the SAW transmitters and receivers are narrow-band, 418 MHz AM, transmitting randomly and infrequently with on the order of a milliwatt of output power, to permit operation without any site licenses under FCC Part 15.231. It is also assumed in this embodiment that messages being transmitted are formatted in the known Echelon Lon Works communication protocol, or in a simplified communications protocol that will serve the purpose herein. Because temperature response of a temperature sensor in a room fed with conditioned air is on the order of minutes, the transmissions of temperature from any given zone, in response to changes of a threshold magnitude therein, will occur no more frequently than once every few minutes, except in response to strong perturbations (such as initial opening of an outside door or window during extreme temperature conditions).

The SAW transmitters, SAW receivers, microprocessors and associated circuitry for each of the zones, for the master controller, and for the HVAC may, of course, be integrated into suitable single units. The SAW transmitters may be formulated utilizing RF Monolithics, Inc. type HX1003 integrated circuits (ICs), and the SAW receivers may be formulated by utilizing RF Monolithics, Inc. type RX1300 ICs, all as is known in the art.

In the embodiment of FIG. 1, it is assumed that all of the information processing to determine what the HVAC should do, and whether any dampers should more open or more closed is achieved in the microprocessor 23. On the other hand, it should be understood that the particular place where the majority of signal processing occurs is irrelevant to the present invention, which relates only to the manner of transmission between elements of the HVAC system. Further, the setpoint inputs could be in each zone and transmitted to any processor which responds thereto to manifest the demand.

Figure 2:
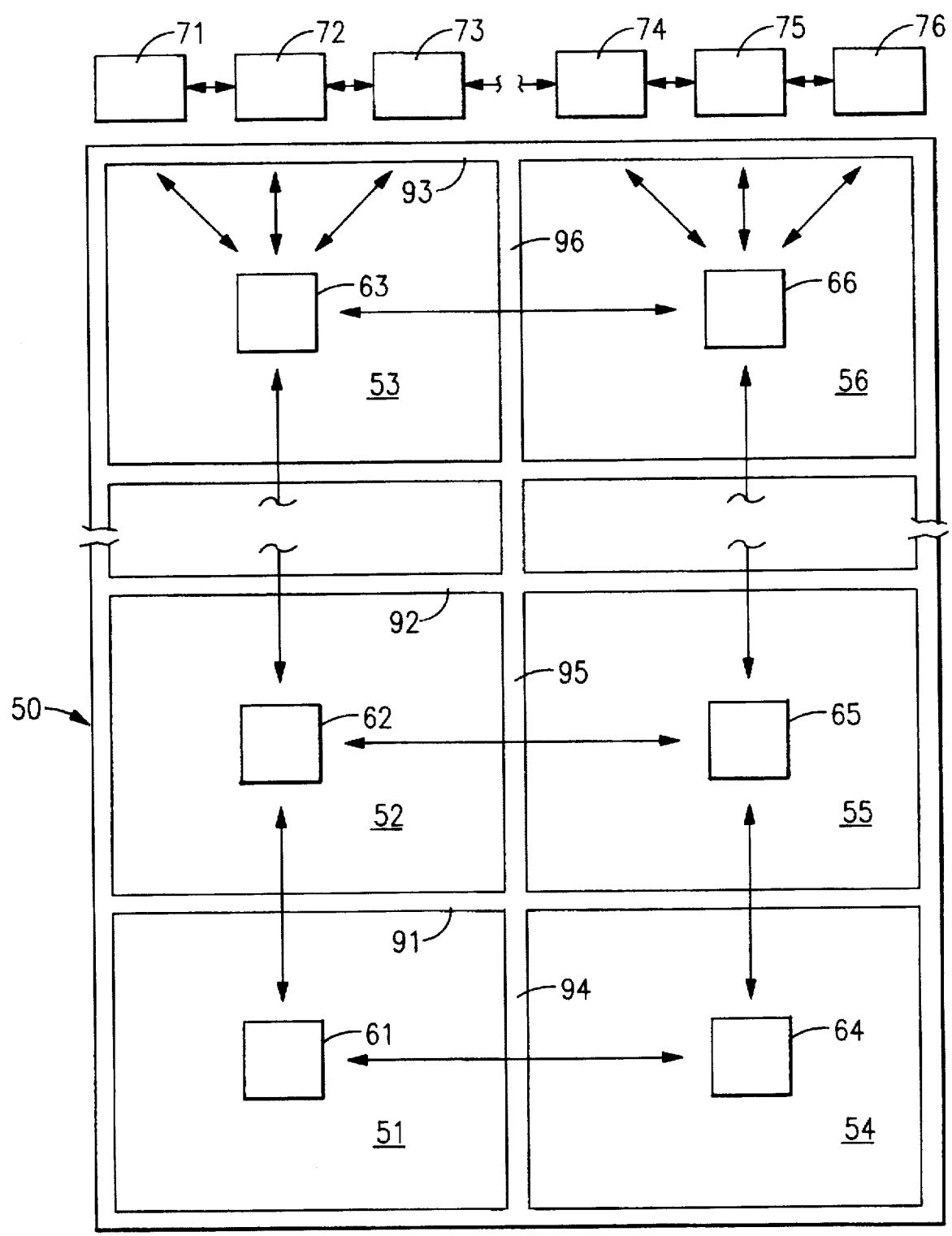
FIG. 2 is a simplified pictorial diagram of a commercial building illustrating a plurality of zones in the building, each having a control and relay assembly and each having a corresponding rooftop HVAC system.
Figure 3:
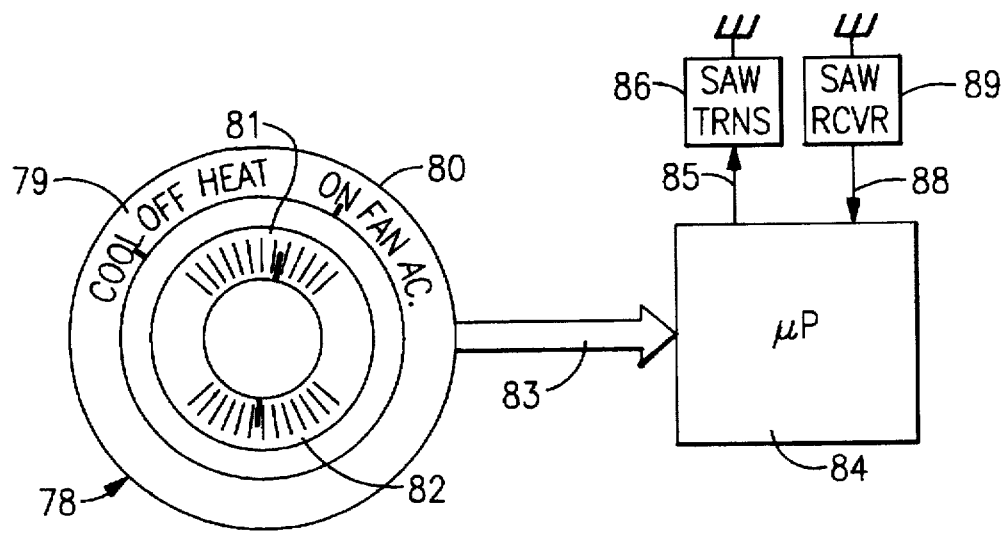
FIG. 3 is a simplified, stylized schematic block diagram of a control and relay unit for the zones of FIG. 2.

Referring now to FIG. 2, a building 50 comprises a plurality of zones 51-56, each having a corresponding thermostat/transceiver assembly 61-66 disposed therein for communicating commands to a related rooftop HVAC system 71-76, for controlling the temperature and air flow within the related zone 51-56. In FIG. 3, each of the thermostat/transceiver assemblies include a wall mounted thermostat 78 which has a service selection switch 79 to command cooling, heating or neither, a fan switch 80 to cause the fan to be on all the time or to turn on only when a demand is being met, a setpoint control 81, and, possibly, a visible thermometer 82. Within the wall mounted thermostat 78, thermo-responsive means will provide signals indicating when there is a demand for the indicated service (that is, it is too warm when cooling is required or it is too cool when heating is required). The wall mounted thermostat 78 is therefore equivalent to the temperature sensors 35, the setpoint inputs 32, and the routines of the microprocessor 23 which generate a condition demand indicating signal for transmission to the HVAC. This signal is provided along with the discrete signals from the switches 79, 80 through signal lines 83 to a microprocessor 84. The microprocessor 84 will formulate a message and send it over signal lines 85 to a SAW transmitter 86 for transmission, in order to cause the related HVAC system 71-76 to respond appropriately. The microprocessor 84 also receives signals on lines 88 from a SAW receiver 89 which may comprise commands from others of the thermostat/transceiver devices 61-66, or, depending upon the protocol used, may comprise an acknowledgment signal from the related HVAC system 71-76. Any message received with an address different from that of the microprocessor 84 (which comprise all received messages except acknowledgement messages for the microprocessor 84) will be retransmitted by the SAW transmitter 86. This is the relay aspect of the present invention.

In FIG. 2, each of the HVAC systems 71-76 is assumed to include the apparatus (not shown) associated with the HVAC 9 in FIG. 1, that is, a microprocessor, a SAW transmitter, and a SAW receiver. A low powered narrow band AM radio transmission on the order of 1 milliwatt is sufficient to transcend the various barriers represented by the building structure. For instance, the floors 91-93 may each comprise steel-reinforced concrete or concrete over steel, and the wall structures between zones may include stairwells, restrooms and the like, and may comprise more than a single wall structure. However, according to the invention, it has been determined that transmissions of narrow band AM at 418 MHz on the order of one milliwatt will penetrate a single wall or floor structure of a concrete building such that the signal can be passed from one unit 61 to another unit 62, and so forth, in a relay fashion. As depicted in FIG. 2, the signals can also be transferred from one unit 61 to another unit 64 and a third unit 65, and so forth. By using a basic methodology that receives signals and only changes stored signals representative of conditions in the system when the received signals indicate a change therein, it is irrelevant how many times a particular HVAC system 71-76 may receive the same message due to being relayed through many of the assemblies 61-66. The messages may in fact be received from the original transmitter as well as from a relaying transmitter, in some cases. However, depending on the message protocol used, it would be simple to have each assembly (e.g., 62) retransmit only messages received from an assembly (e.g., 61) farther from the HVACs 71-76. Or, the transmissions could all be unicast—e.g., 61 to 62, 62 to 63, etc., by using specific addresses, for initial transmissions and for retransmissions. All of this is well within the skill of the art.

Figure 4:
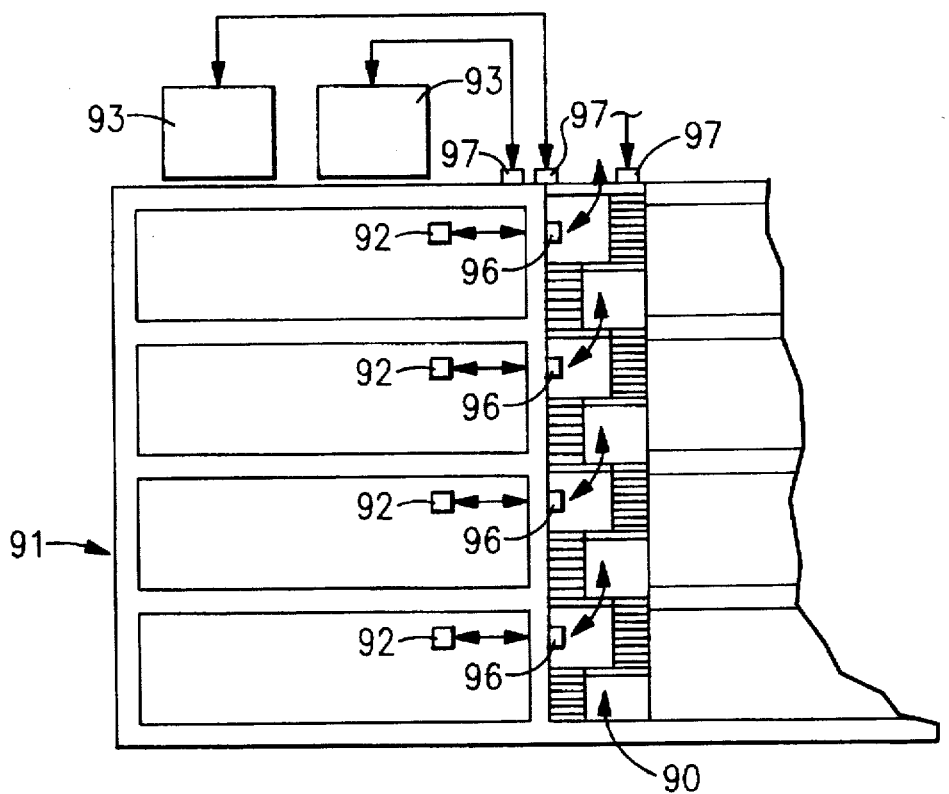
FIG. 4 is a simplified, stylized pictorial illustration of utilizing low power SAW transmitters and receivers for transmitting HVAC control messages through a stairwell of a building, in accordance with another aspect of the invention.

Referring now to FIG. 4, another embodiment of the invention utilizes the stairwell 90 of a building 91 as a low attenuation path for transmitting HVAC control messages between thermostat-receiver assemblies 92 in each zone of the building and corresponding HVAC systems 93 on the rooftop of the building. Transmission is effected between one of the assemblies 92 and a corresponding relay transceiver 96 disposed adjacent thereto on the same building level within the stairwell 90, and corresponding transceivers 97 on the rooftop. In this case, no relay operation is required between the transceiver assemblies 92 or between transceiver assemblies 96 since the transmission can easily be effected in the open stairwell 90. Thus, each related pair of transceiver assemblies 92 and 96 form an independent communication channel. Of course, if the stairwell attenuates the signals too much, relay function may be provided by the transceivers 96. In the embodiment of FIG. 4, each of the HVAC systems 93 has a corresponding transceiver 97 on the rooftop; however, in a suitable situation, only a single rooftop transceiver and microprocessor is required on the rooftop, the microprocessor sorting out the signals and providing them to the correct, corresponding HVAC system, in each case.

In the embodiment of FIG. 4, the transceiver assemblies 97 are shown hard-wired to the corresponding HVAC systems 93; the invention may as well be practiced, however, utilizing transceivers at the HVAC systems 93, as in the embodiment of FIG. 1, for communication with one or more transceivers 97 on the rooftop.

As is common in the industry, the term "air conditioning" usually refers to air cooling with its attendant dehumidification, but sometimes include humidity control as such, and freshness control ($CO_2$ level); but the term "conditioning air" usually means heating, cooling, controlling the humidity or freshness of air, and it is used in that way herein. The present invention may be used in an air conditioning and/or heating and ventilating system: that is, it may be used in a central heating system which does not provide cooling and it may be used in a central cooling system which does not provide heat; it may be used with or without humidity or freshness control.

In the embodiment of FIG. 1, the temperature sensors 35 are separate from the temperature setpoint inputs 32, and the microprocessor will respond to manifestations from each in order to provide a condition demand indicating signal to control the manner in which the HVAC conditions air. In the embodiments of FIGS. 2-4, the setpoint is manifested by adjusting the positional bias of a thermostatic switch, and the temperature is manifested by thermostatic switch motion responsive to temperature to cause it to actuate appropriately, in dependence upon the setpoint. In this case, the switch itself provides the condition demand indicating signal to control the manner in which the HVAC conditions the air.

In the embodiment of FIGS. 2-4, the thermostat and switch assembly 78 processes all the necessary information to provide simple demand signals on the lines 83, which, absent the invention, would go to the appropriate parts of the corresponding HVAC system 71-76 directly by wire. In a commercial embodiment wherein other than an analog, wall mounted thermostat/switch assembly 78 is utilized, temperature sensors may be utilized and processing may be achieved in the microprocessor 84 of each of the assemblies 61-66 or in the corresponding processor in each of the HVAC systems 71-76. Such is irrelevant to the invention, which relates only to the manner of transmission of the manifestations (setpoint, temperature and corresponding demand), as well as heat/cool/off and fan on/auto discretes.

In the embodiments of FIGS. 2-4, infrequent, random transmissions are achieved by transmitting a signal only when the demand signal changes from demanding heating and cooling to cessation thereof, or changes from there being no demand to a demand for heating or cooling.

Thus, although the invention has been shown and described with respect to exemplary embodiments thereof, it should be understood by those skilled in the art that the foregoing and various other changes, omissions and additions may be made therein and thereto without departing from the spirit and scope of the invention.

We claim:

1. A building having a plurality of HVAC zones, each zone including an air conditioning and/or heating and ventilating (HVAC) system comprising a plurality of components including:

HVAC apparatus for conditioning and moving air within the corresponding zone in response to condition demand manifestations signals;

setpoint means for providing a manifestation of desired value of a characteristic of air which affects indoor air quality in said corresponding zone;

sensor means responsive to said characteristic of air for providing a manifestation of the actual value of said characteristic in said corresponding zone;

demand means for generating a condition demand indication signal in response to said manifestation of actual value as a function of said manifestation of desired value and for providing an HVAC condition demand manifestation corresponding to said condition demand indicating signal; and each zone further comprising:

a low power, SAW-stabilized, narrow band, AM transmitter at one of said components for transmitting a corresponding one of said manifestations; and a SAW-stabilized, narrow band, AM receiver at another one of said components for receiving said corresponding one of said manifestations.

2. A building according to claim 1 wherein said characteristic is temperature.

3. A building according to claim 1 wherein said characteristic is carbon dioxide level.

4. A building according to claim 1 wherein said characteristic is relative humidity.

5. A building according to claim 1 wherein:

each of said HVAC apparatii includes one of said receivers;

each of said demand means includes one of said transmitters for transmitting said HVAC condition demand manifestation.

6. A building according to claim 5 wherein each of said demand means includes a SAW-stabilized, narrow band, AM receiver for receiving ones of said HVAC condition demand manifestations transmitted by said demand means of a zone other than the zone corresponding thereto; and said demand means retransmits said ones of said HVAC condition demand manifestations.

7. A building according to claim 5 wherein said SAW-stabilized transceivers retransmit all of said HVAC condition demand signals received thereat.

8. A building according to claim 1 wherein said building includes a plurality of floor levels and a stairwell extending between all of said floor levels, and further comprising:

a low power, SAW-stabilized, narrow band, AM transceiver disposed in said stairwell for retransmitting ones of said HVAC condition demand signals received thereat.

9. A building according to claim 8 wherein said SAW-stabilized transceivers retransmit all of said HVAC condition demand signals received thereat.

10. A building according to claim 1 wherein said building includes a plurality of floor levels and a stairwell extending between all of said floor levels, and further comprising:

a low power, SAW-stabilized, narrow band, AM transceiver disposed in said stairwell at each of said floors for retransmitting ones of said HVAC condition demand signals received thereat.

11. A building according to claim 10 wherein said SAW-stabilized transceivers retransmit all of said HVAC condition demand signals received thereat.

12. An air conditioning and/or heating and ventilating (HVAC) system comprising a plurality of components including:

HVAC apparatus for conditioning and moving air in response to condition demand manifestations provided thereto;

setpoint means for providing a manifestation of a desired value of a characteristic of air which affects indoor air quality;

sensor means responsive to said characteristic of air for providing a manifestation of the actual value of said characteristic; and demand means for generating a condition demand indication signal in response to said manifestation of actual value as a function of said manifestation of desired value and for providing an HVAC condition demand manifestation corresponding to said condition demand indicating signal; and further comprising:

a low power, SAW-stabilized, narrow band, AM transmitter at one of said components for transmitting a corresponding one of said manifestations; and a SAW-stabilized, narrow band, AM receiver at another one of said components for receiving said corresponding one of said manifestations.

13. A system according to claim 12 wherein:

said sensor means includes said transmitter for transmitting said manifestation of actual value; and said demand means includes of said receiver for receiving said manifestation of actual value.

14. A system according to claim 12 wherein:

said demand means includes said transmitter for transmitting said HVAC condition demand manifestation; and said HVAC apparatus includes said receiver for receiving said HVAC condition demand manifestation.

15. A system according to claim 12 further comprising:

a damper associated with said sensor means; and means including a SAW-stabilized, narrow band, AM receiver, and a low power, SAW-stabilized, narrow band, AM transmitter for providing a damper position command manifestation to said damper to control its position as a function of said actual value.

16. A building according to claim 12 wherein said characteristic is temperature.

17. A building according to claim 12 wherein said characteristic is carbon dioxide level.

18. A building according to claim 12 wherein said characteristic is relative humidity.

19. A method of operating an air conditioning and/or heating and ventilating (HVAC) system having a plurality of components including HVAC apparatus for conditioning and moving air in response to condition demand manifestations provided thereto, setpoint means for providing a manifestation of a desired value of a characteristic of air which affects indoor air quality, sensor means for providing a manifestation of actual value of said characteristic, and demand means for generating a condition demand indication signal in response to said manifestation of actual value as a function of said manifestation of desired value and for providing an HVAC condition demand manifestation corresponding to said condition demand indicating signal, said method comprising:

transmitting at least one of said manifestations by means of a low power, SAW-stabilized, narrow band, AM transmitter at the corresponding one of said components; and receiving said one manifestation by means of a SAW-stabilized, narrow band, AM receiver at another one of said components.

20. A method according to claim 19 wherein said transmitting step comprises transmitting said HVAC condition demand manifestation.

21. A method according to claim 19 wherein said transmitting step comprises transmitting said manifestation of actual value.

22. A method according to claim 19 additionally comprising, between said steps of transmitting and receiving, the steps of:

receiving said one manifestation by means of a second receiver; and retransmitting said one manifestation by means of a second transmitter associated with said second receiver.

23. A method according to claim 22 wherein said characteristic is temperature.

24. A method according to claim 22 wherein said characteristic is carbon dioxide level.

25. A method according to claim 22 wherein said characteristic is relative humidity.

26. A method of operating a plurality of HVAC zones in a building, each zone including an air conditioning and/or heating and ventilating (HVAC) system having a plurality of components including HVAC apparatus for conditioning and moving air within the corresponding zone in response to condition demand manifestations signals, setpoint means for providing a manifestation of desired value of a characteristic of air which affects indoor air quality in said corresponding zone, sensor means for providing a manifestation of actual value of said characteristic in said corresponding zone, demand means for generating a condition demand indication signal in response to said manifestation of actual value as a function of said manifestation of desired value and for providing an HVAC condition demand manifestation corresponding to said condition demand indicating signal, said method comprising:

in each zone, transmitting at least one of said manifestations by means of a low power, SAW-stabilized, narrow band, AM transmitter at one of said components corresponding to said zone; and receiving said one manifestation by means of a SAW-stabilized, narrow band, AM receiver at another one of said components corresponding to said zone.

27. A method according to claim 26 further comprising:

in each zone, receiving said one of said manifestations transmitted by one of said transmitters in another one of said zones; and retransmitting said one of said manifestations received from said another one of said zones.

28. A method of operating a plurality of HVAC zones in a building having a plurality of floor levels and a stairwell extending between all of said levels according to claim 26, comprising:

in each zone, transmitting said one manifestation from a transmitter at said one component on a first one of said levels;

in said stairwell, receiving and retransmitting said one manifestation; and receiving said one manifestation at said another one of said components on a second one of said levels.

29. A method according to claim 26 wherein said characteristic is temperature.

30. A method according to claim 26 wherein said characteristic is carbon dioxide level.

31. A method according to claim 26 wherein said characteristic is relative humidity.

* * * * *